US011375739B2

(12) United States Patent
Merrill (10) Patent No.: US 11,375,739 B2
(45) Date of Patent: Jul. 5, 2022

(54) METHOD OF REMOVING TISSUE FROM FOOD PRODUCT

(71) Applicant: MP Equipment, LLC, Gainesville, GA (US)

(72) Inventor: Ernest Merrill, Atlanta, GA (US)

(73) Assignee: MP EQUIPMENT, LLC, Gainesville, GA (US)

( * ) Notice: Subject to any disclaimer, the term of this patent is extended or adjusted under 35 U.S.C. 154(b) by 288 days.

(21) Appl. No.: 16/597,450

(22) Filed: Oct. 9, 2019

(65) Prior Publication Data

US 2020/0113224 A1     Apr. 16, 2020

Related U.S. Application Data

(60) Provisional application No. 62/743,807, filed on Oct. 10, 2018.

(51) Int. Cl.
| | |
|---|---|
| *G06T 17/00* | (2006.01) |
| *A23P 30/10* | (2016.01) |
| *A23G 3/52* | (2006.01) |
| *G06T 19/20* | (2011.01) |
| *G06F 16/432* | (2019.01) |
| *A61C 9/00* | (2006.01) |

(52) U.S. Cl.
CPC ............... *A23P 30/10* (2016.08); *A23G 3/52* (2013.01); *A61C 9/0053* (2013.01); *G06F 16/434* (2019.01); *G06T 17/00* (2013.01); *G06T 19/20* (2013.01); *G06T 2200/08* (2013.01)

(58) Field of Classification Search
None
See application file for complete search history.

(56) References Cited

U.S. PATENT DOCUMENTS

| | | | |
|---|---|---|---|
| 5,324,228 | A | 6/1994 | Vogeley, Jr. |
| 5,944,598 | A | 8/1999 | Tong et al. |
| 6,099,473 | A | 8/2000 | Liu et al. |
| 6,198,834 | B1 | 3/2001 | Belk et al. |
| 6,563,904 | B2 | 5/2003 | Wijts et al. |
| 6,623,348 | B1 | 9/2003 | O'Neill |

(Continued)

OTHER PUBLICATIONS

Website The BAADER Food Processing Machinery <URL: https://www.baader.com/en/index.html> [Retrieved from the Internet Jan. 20, 2020].

*Primary Examiner* — Yi Wang
(74) *Attorney, Agent, or Firm* — Barnes & Thornburg LLP (57) ABSTRACT

A method for identifying and removing tissue from a food product that includes generating a three-dimensional model of a food product using a scanner and mapping the three-dimensional model onto the food product. The method also includes scanning the food product such that cross-sectional scanning images are generated based on the model, and, for each cross-sectional scanning image, determining a maximum thickness of the model and identifying a corresponding estimated tissue point, by using an identification method based on suitable characteristics of the food product model. The method includes fitting a curve to the estimated tissue points and generating a cut path based on the fitted curve, wherein the cut path defines an area of unwanted tissue that includes the estimated tissue points. The method further includes cutting the food product along the cut path, thereby, removing the area of unwanted tissue.

19 Claims, 12 Drawing Sheets

(56) References Cited

U.S. PATENT DOCUMENTS

| | | | |
|---|---|---|---|
| 7,025,196 B2 | 4/2006 | Pfarr et al. |
| 7,052,388 B2 | 5/2006 | Houtz |
| 7,153,203 B2 | 12/2006 | Pfarr et al. |
| 7,156,730 B1 | 1/2007 | Blaine |
| 7,210,993 B2 | 5/2007 | Woods et al. |
| 7,251,537 B1 | 7/2007 | Blaine et al. |
| 7,285,040 B2 | 10/2007 | Ilch et al. |
| 7,373,217 B2 | 5/2008 | Young |
| 7,452,266 B2 | 11/2008 | Bottemiller |
| 7,500,550 B2 | 3/2009 | Strong et al. |
| 7,593,785 B2 | 9/2009 | Blaine et al. |
| 7,621,806 B2 | 11/2009 | Bottemiller et al. |
| 7,651,388 B2 | 1/2010 | Faires et al. |
| 7,672,752 B2 | 3/2010 | Blaine et al. |
| 7,715,935 B2 | 5/2010 | Vogeley, Jr. et al. |
| 7,747,042 B2 | 6/2010 | Blaine |
| 7,841,264 B2 | 11/2010 | Kim et al. |
| 7,949,414 B2 | 5/2011 | Blaine et al. |
| 8,233,668 B2 | 7/2012 | Jing et al. |
| 8,683,903 B2 | 4/2014 | Strong et al. |
| 8,688,267 B2 | 4/2014 | Blaine et al. |
| 8,839,949 B2 | 9/2014 | Vogeley, Jr. |
| 8,869,664 B2 | 10/2014 | Eyles et al. |
| 9,091,673 B2 | 7/2015 | Fern et al. |
| 9,095,147 B2 | 8/2015 | Hjalmarsson et al. |
| 9,285,213 B2 | 3/2016 | Lindee et al. |
| 9,642,376 B1 | 5/2017 | Chappell et al. |
| 9,675,091 B1 | 6/2017 | Eger |
| 9,778,651 B2 | 10/2017 | Strong et al. |
| 9,888,696 B2 | 2/2018 | Lindee et al. |
| 9,913,483 B2 | 3/2018 | Vuholm et al. |
| 10,286,570 B2 | 5/2019 | Krog |
| 10,427,882 B2 | 10/2019 | Gill et al. |
| 10,531,815 B2 * | 1/2020 | Lu | A61B 1/0002 |
| 2016/0288355 A1 | 10/2016 | Sorensen et al. |
| 2017/0135357 A1 | 5/2017 | Finnsson et al. |
| 2017/0210023 A1 | 7/2017 | Hocker et al. |
| 2018/0027848 A1 | 2/2018 | Blaine |
| 2018/0029246 A1 | 2/2018 | Blaine |
| 2018/0158537 A1 | 6/2018 | Blaine |
| 2018/0281220 A1 | 10/2018 | Sorensen et al. |
| 2018/0333752 A1 | 11/2018 | Yoon et al. |
| 2018/0360054 A1 | 12/2018 | Hanning et al. |
| 2019/0009421 A1 | 1/2019 | Grasselli |
| 2019/0187662 A1 | 6/2019 | Phan et al. |
| 2021/0092968 A1 * | 4/2021 | Blaine | A22B 5/16 |

\* cited by examiner

METHOD OF REMOVING TISSUE FROM FOOD PRODUCT

This application claims the benefit of priority under 35 U.S.C. § 119(e)(1) of U.S. Provisional Application Ser. No. 62/743,807, filed Oct. 10, 2018, the entire contents of which are incorporated herein by reference.

FIELD OF INVENTION

The present invention relates to a food processing system and a method for identifying and removing undesirable tissues from food products. More particularly, certain embodiments of the present invention relate to a system and method for identifying and removing tough tissues, such as bones, cartilage, and fat, in large-scale processed foods, such as fish or beef.

BACKGROUND OF INVENTION

In the industry of high-volume production of food products, it is desirable to efficiently remove undesirable portions of food products, for example, fish and beef, before sending the food products to be fried, battered, or otherwise processed. The undesirable portions of the food products may include bones, cartilage, and fat. In some instances, for example, many bones are easily identifiable because the bones are either large or visible to the naked eye, and, thus, can be removed efficiently from the food product. In other instances, small bones or bones embedded in the food product are more difficult to locate such that they cannot be quickly removed.

Small bones are common in food products, like fish. Fish, such as white fish or salmon, have pin bones, which are short, curved bones that attach to the spinal column. When a fish is filleted and the head of the fish removed, the pin bones may be hidden under the flesh.

Historically, the process of identifying and removing hidden pin bones involved manual identification and removal. A person on the filleting line would be able to see the spinal column on the fillet as a series of dots or bumps extending from the spinal column. The person cutting would then run their finger along the spinal column from where the head was cut off, and feel which vertebrae still had pin bones attached. The person would then cut away the portion of the fish containing the remaining pin bones. This manual process of removing pin bones from fish fillets would slow down the total throughput of processed fish and, therefore, was inefficient. Additionally, manual cutting is inconsistent often either removing too much meat or not removing all the pin bones. As such, it would be desirable to provide an automated process for identifying and accurately removing pin bones from fish fillets.

More recently, some companies have recognized that automatically removing bones from food products is desirable to enhance operating efficiencies. However, there remain several drawbacks to current processes. For example, it is known that bones can be easily identified using x-ray machines or scanners. As such, some processes have implemented x-ray technology into their food processing systems to identify bones in food products, including pin bones in fish. While an x-ray scanner can locate bones and their orientation with great accuracy, implementing x-ray scanners on food processing lines can be expensive. It would therefore be desirable to provide a bone location process and system without the added cost of implementing and maintaining expensive x-ray equipment.

Using computer vision alone (unaided by other techniques) to detect features on the surface of the fish is another possible technique. Such imaging techniques, however, have limitations, including requiring a person with sufficient knowledge and experience in the processing of particular food products to sift through the many images. Additionally, current computer systems have difficulty identifying common patterns, like a series of white dots, that correlate to pin bone locations or distinguishing between other patterns. Thereby, while estimating pin bone locations solely using imaging is desirable, it is difficult to do reliably with the state of current technology. It would, however, be desirable if the estimation of pin bones could be done completely by a computer system without human intervention.

Further, known mechanical techniques for removing pin bones, like vacuum removal, are generally slower than pin bone removal for digitally-processed food products. Mechanical pin bone removal processing methods typically include an additional station for manually verifying removal of the pin bones or removing the remaining pin bones. As such, it is desirable to design a pin bone removal system and method that does not require manual verification.

Further limitations and disadvantages of conventional, traditional, and proposed approaches will become apparent to one of skill in the art, through comparison of such systems and methods with the present invention as set forth in the remainder of the present application with reference to the drawings.

SUMMARY

A first aspect of the present invention regards a method for identifying and removing tissue from a food product that includes generating a three-dimensional model of a food product using a scanner and mapping the three-dimensional model onto the food product. The method also includes scanning the food product such that cross-sectional scanning images are generated based on the three-dimensional model, and, for each cross-sectional scanning image, determining a maximum thickness of the food product based on the three-dimensional model and identifying a corresponding estimated tissue point, using an identification method selected from the group consisting of: (a) wherein a thickness of the cross-sectional scanning image of the three-dimensional model is at least a predetermined percentage of the maximum thickness on the food product, and (b) wherein the point is selected as being on the ventral side of the point of maximal thickness and a distance from the point of maximal thickness, where the distance can be customized based on a particular size of the model. The method also includes fitting a curve to the estimated tissue points and generating a cut path based on the fitted curve, wherein the cut path defines an area of unwanted tissue that includes the estimated tissue points. The method further includes cutting the food product along the cut path, thereby, removing the area of unwanted tissue.

A second aspect of the present invention regards a system for removing tissue from a food product that includes a scanner for generating a three-dimensional model of the food product, wherein the scanner scans the food product such that one or more cross-sectional scanning images are generated. The system also includes a processor for mapping the three-dimensional model onto the food product, scanning the food product such that cross-sectional scanning images are generated based on the three-dimensional model, and, for each cross-sectional scanning image, the processor determines a maximum thickness of the food product based on the three-dimensional model and identifies a corresponding estimated tissue point, by using an identification method selected from the group consisting of: (a) wherein a thickness of the cross-sectional scanning image of the three-dimensional model is at least a predetermined percentage of the maximum thickness on the food product, and (b) wherein the point is selected as being on the ventral side of the point of maximal thickness and a distance from the point of maximal thickness, where the distance can be customized based on a particular size of the model. The processor also fits a curve to the estimated tissue points and generates a cut path based on the fitted curve, wherein the cut path defines an area of unwanted tissue that includes the estimated tissue points. The system further includes a cutting assembly for cutting the food product along the cut path, thereby, removing the area of unwanted tissue.

A third aspect of the present invention regards a computer-readable medium for executing instructions to perform a method for identifying and removing tissue from a food product, including, mapping a three-dimensional model onto a food product and scanning the food product such that cross-sectional scanning images are generated based on the three-dimensional model. The method executed by the computer-readable medium includes determining, for each cross-sectional scanning image, a maximum thickness of the food product based on the three-dimensional model and identifying a corresponding estimated tissue point, by using an identification method selected from the group consisting of: (a) wherein a thickness of the cross-sectional scanning image of the three-dimensional model is at least a predetermined percentage of the maximum thickness on the food product, and (b) wherein the point is selected as being on the ventral side of the point of maximal thickness and a distance from the point of maximal thickness, where the distance can be customized based on a particular size of the model. The method executed by the computer-readable medium further includes fitting a curve to the estimated tissue points and generates a cut path based on the fitted curve, wherein the cut path defines an area of unwanted tissue including the estimated tissue points. The method executed by the computer-readable medium also involves controlling a cutting assembly for cutting the food product along the cut path, thereby, removing the area of unwanted tissue.

One or more aspects of the present invention provide the advantage of incorporating three-dimensional modelling into food processing such that the process for estimating the location of undesirable tissue and removing such tissue is improved.

One or more aspects of the present invention provide the advantage of scanning using visible light, which is cheaper than X-Ray imaging and faster than current mechanical techniques.

These and other advantages and novel features of the present invention, as well as details of an illustrated embodiment thereof, will be more fully understood from the following description and drawings.

DETAILED DESCRIPTION

Figure 1:
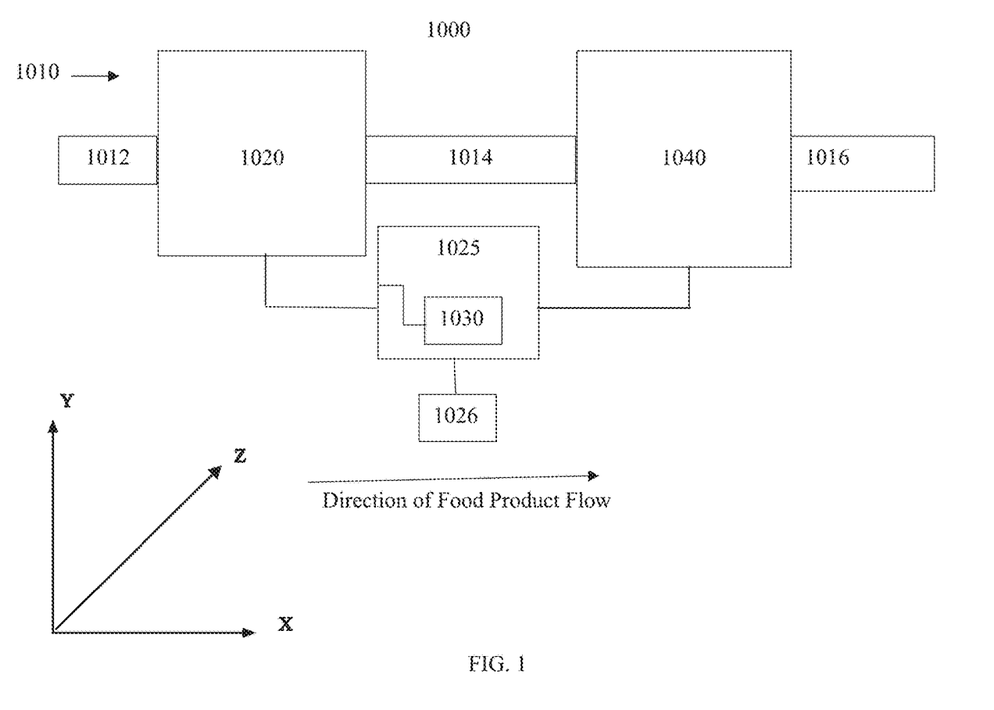
FIG. 1 is a perspective view of a system representing an embodiment of a system for identifying and removing tissue from a food product, in accordance with the present invention.

As shown in FIG. 1, the system 1000 includes an input side 1010 where the food product enters the system 1000. The food product flows in the x-direction as shown in FIG. 1. In some embodiments, the system 1000 includes a conveyor 1012 for carrying the food product through the system 1000. In the present invention, the conveyor 1012 passes under the scanner 1020 where the scanner takes a series of images to generate a three-dimensional model of the food product. The system 1000 further includes a computer system 1025, which communicates with scanner 1020. Computer system 1025 includes a processor 1030 for performing the method of the present invention, as will be described in further detail below. Further, system 1000 includes the cutting assembly 1040 for cutting the food product and removing the undesirable tissue.

In some embodiments, the infeed conveyor 1012 may extend through the system 1000. However, as shown in FIG. 1, the system 1000 may include an outfeed conveyor 1014 placed adjacent to the end of infeed conveyor 1012 that is positioned at either the entrance or exit end of the scanner 1020. The outfeed conveyor 1014 may extend to an exit end of the cutting assembly 1040 The food product may be transferred from the infeed conveyor 1012 to outfeed conveyor 1014 for the cutting step of the inventive process because outfeed conveyor 1014 may be formed from a durable material, like metal, such that it can withstand existing methods of industrial cutting, such as high-pressured water jets performed within cutting assembly 1040. The present invention may also include an additional conveyor 1016 positioned at the exit end of the cutting assembly 1040 and used for discarding the removed tissue from the system 1000 or transporting the cut food product to another food processing system, such as baking, battering, or breading.

Figure 2:
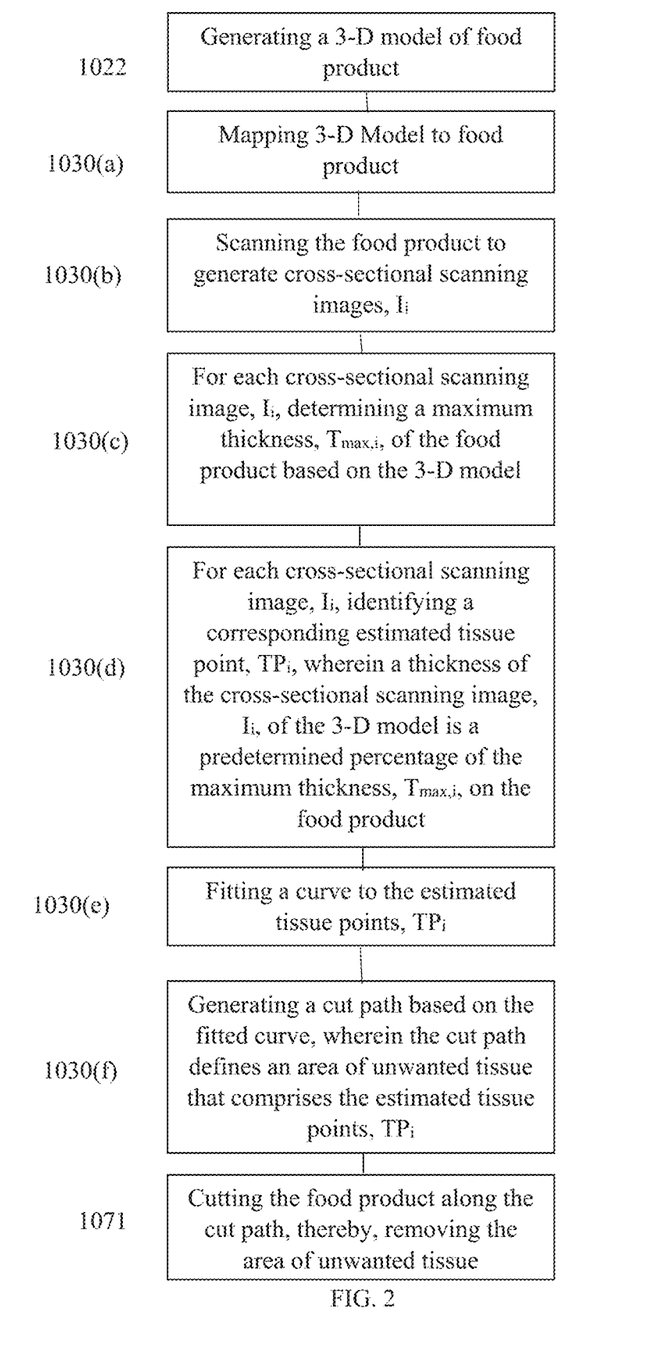
FIG. 2 is a flow diagram representing an embodiment of a method for identifying and removing tissue from a food product, in accordance with the present invention.

In some embodiments, computer system 1025 may incorporate the processing capabilities of the scanner 1020 such that computer system 1025 operate within a single computer. Similarly, the computer system 1025 may incorporate the control functionality of the cutting assembly 1040, and, thereby, it is contemplated that a robust computer system 1025 and/or processor 1030 be used with the system 1000. FIG. 2 illustrates a process performed by system 1000 for identifying and removing undesirable food products from a food product, like fish, beef, chicken, or any other food product having tough tissues.

Figure 3A:
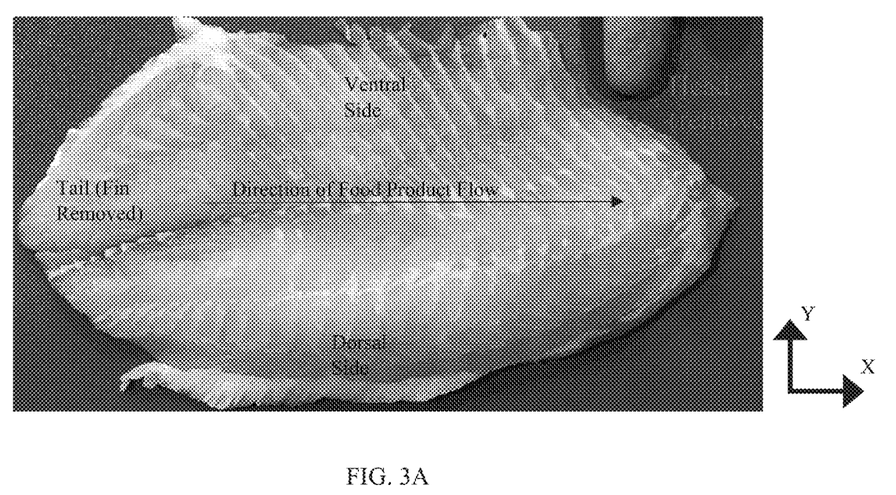
FIG. 3A is a top view of a possible fish fillet to be processed using the method of FIG. 2.
Figure 3B:
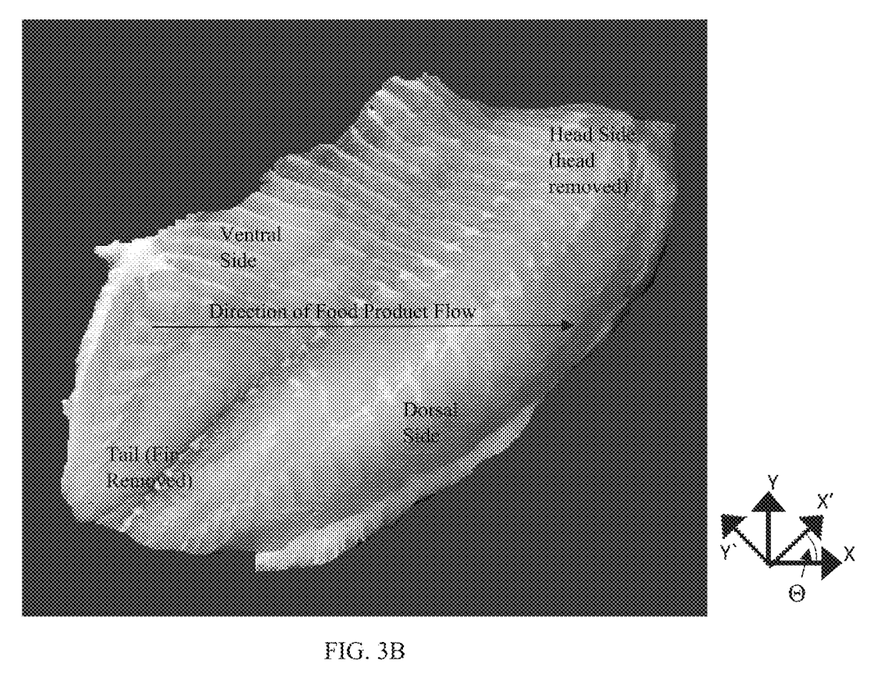
FIG. 3B is a top view of a possible fish fillet to be processed using the method of FIG. 2 offset from the direction of product flow.

In the present invention, to assure the food product can be properly analyzed and cut, as will be described in further detail below, the food product should be oriented on the conveyor 1012 such that scanner 1020, processor 1030, and cutting assembly 1040 operate with reference to the same coordinate system. As shown in FIG. 3A, the fish fillet is oriented such that the skin-side of the fillet (i.e. the underside of the fish, not shown) lies against the conveyor 1012 and the head of the fillet falls in the direction of the product flow along the x-axis. In other embodiments, as shown in FIG. 3B, the food product can be oriented in any direction relative to the flow of food in an axis, x'-y'. In such embodiments, the processor 1030 may require an additional step of transforming alternative orthogonal coordinates X', Y', angled by an angle, Θ, relative to the X-Y coordinate system. For example, if the head of the fillet is placed on the conveyor 1012 at an angle Θ=45° relative to the direction of product flow (i.e. the x-axis), as shown in FIG. 3A, the processor 1030 will have to rotate the x-y coordinates by 45° to coincide with the orientation of the fish fillet to analyze the three-dimensional model, as will be described in further detail below.

Alternatively, it is contemplated that the orientation of the food product relative to the system 1000 need not be uniform. In fact, the system 1000 may be able to process the food product regardless of its orientation. In such a system 1000, the scanner 1020 and/or computer system 1025 may be able to process the food product based on characteristics unique to the processed food product. For example, pin bones in white fish are often easily identifiable if the dorsal neck point and dorsal edge can be identified, as will be described below in further detail. As such, once these unique characteristics are identified by the scanner 1020 and/or computer system 1025, the white fish can be processed on a coordinate system unique to that fish fillet.

Figure 4:
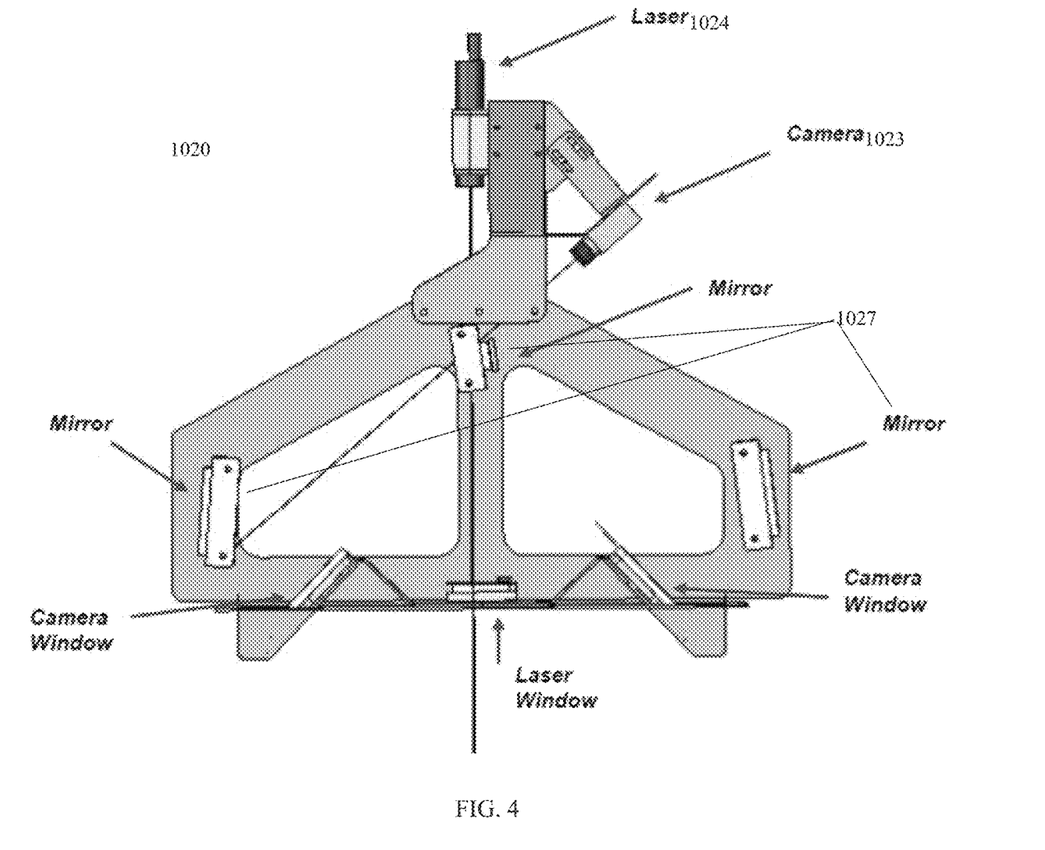
FIG. 4 is a side-view of a possible embodiment of a scanner for use with the system in FIG. 1.

After the food products enter the system 1000, the scanner 1020 generates a three-dimensional model of the food product, shown in FIG. 2 as step 1022. The scanner 1020 may include a digital camera that takes a series of pictures of the food product at set intervals of travel, for example, every one millimeter. The scanner 1020 may include a digital camera that takes a series of images of a laser stripe shining on the food product at set intervals of travel, such as one millimeter, as shown in FIG. 4. The scanner 1020 may also incorporate other known methods of imaging to generate a three-dimensional model 1050 (see FIGS. 7-9) of the food product. The series of images taken by the scanner 1020 are sent to computer system 1025 so the images can be compiled to generate a three-dimensional model 1050 of the food product. In other embodiments, the images can be taken at irregular intervals, or smaller or larger increments depending on the preference of the user and the desired accuracy of the model 1050. Accordingly, the fewer images that are taken the more interpolation between the images is required to generate the three-dimensional model 1050.

Along with generating a three-dimensional model 1050 of the food product, the computer system 1025 assigns each image a coordinate value to record the model's position relative to the conveyor 1012. The coordinate values are a set of three-dimensional coordinates that exist in the x-y coordinate plane shown in FIG. 3 with the z-axis (not shown-coming out of the page perpendicular to the x-y axis). In some embodiments, the computer system 1025 implements a camera calibration method that establishes a fixed relationship between the images taken by the camera 1023 and the location of the food product on the infeed conveyor 1012. Such a calibration allows the three-dimensional model to be built, processed, and analyzed without reference to the real-world system 1000. In other embodiments, other suitable approaches for identifying points in three-dimensional space may be used, including, for example, a polar coordinate system.

Figure 5:
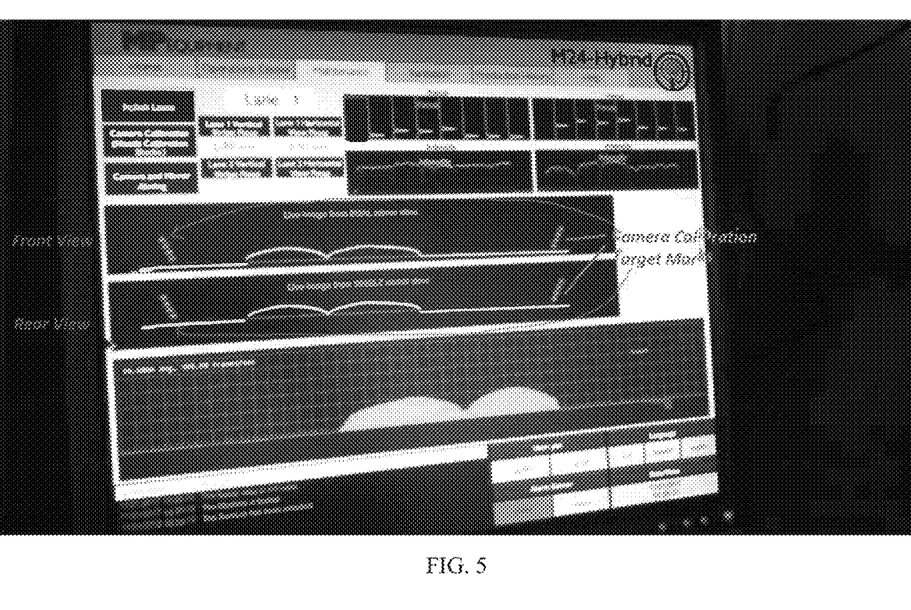
FIG. 5 is a cross-sectional view of an array of images taken by the scanner of FIG. 4
Figure 6:
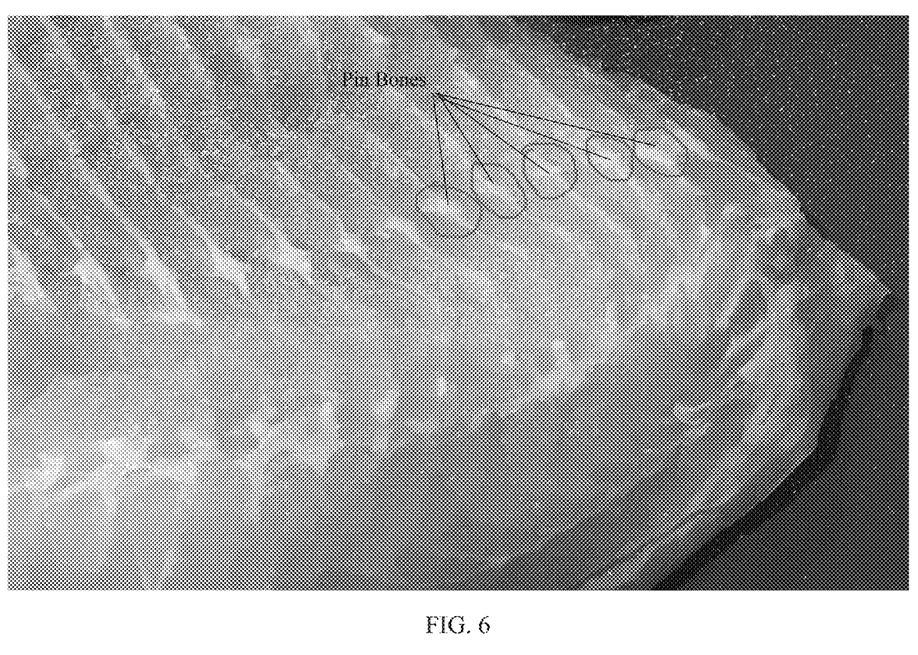
FIG. 6 is a top, close-up view of the fish fillet of FIGS. 3A-B with the pin bones identified by circles.

In the present embodiment, the food product is scanned as it approaches the light emitting devices of the scanner 1020 located above the conveyor 1020, as shown in FIG. 4. The scanner 1020 includes a digital camera 1023, a laser 1024, and a system of mirrors 1027 mounted onto a frame. The laser 1024 emits a laser stripe spanning the infeed conveyor 1012 and the food product thereon. The camera 1023 uses a set of mirrors 1027 to view the laser from both the front and back of the food product. The camera 1023 takes images at a set rate, for example, 200 frames/second. As shown in FIG. 5, the front and back images, taken together, are combined at each location to generate a compiled cross-sectional image of the food product. The computer system 1025 then stitches successive compiled images to create the three-dimensional model 1050 of the food product. In other embodiments, it is possible to have more than one scanner 1020 to scan incoming food product. The scanners may be located at any suitable point along the conveyor 1012 so long as the scanner or set of scanners 1020 can assess the food product in three dimensions.

Figure 7:
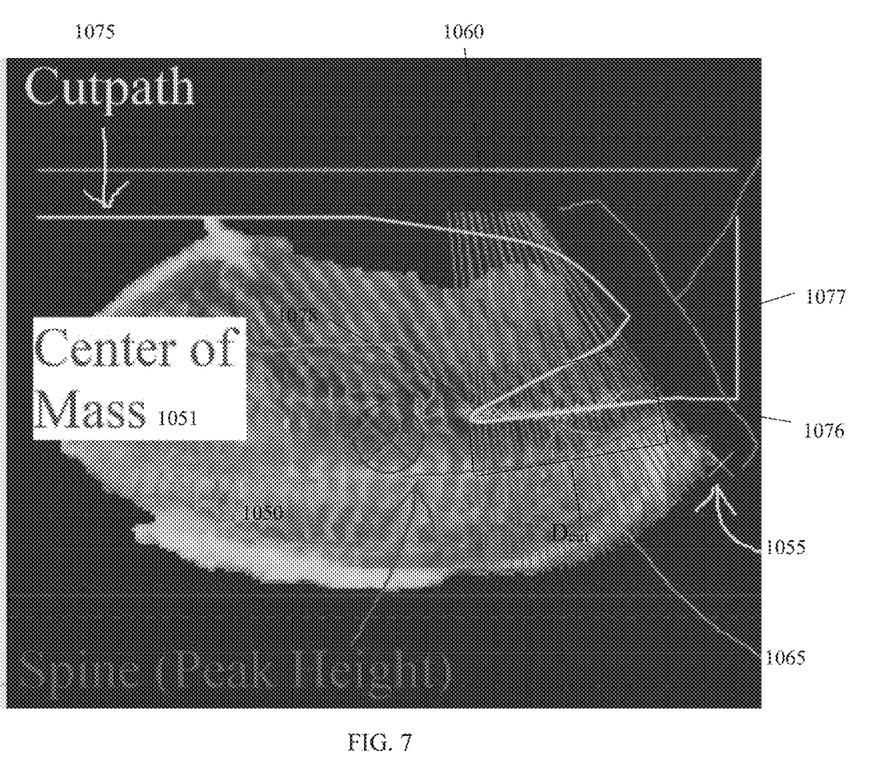
FIG. 7 is a top view of an image of the fish fillet of FIGS. 3A-B with scan lines generated from a three-dimensional model mapped to the fillet.

Once a three-dimensional model 1050 of the food product is generated, the processor 1030 performs a set of functions, shown in FIG. 2 as steps 1030(a)-1030(f), based on the three-dimensional model 1050. One function, as shown in FIG. 7, includes the processor 1030 mapping scan lines 1060 to the three-dimensional model 1050. For example, when mapping potential scan lines to a model of a fish fillet, it is desirable to place the scan lines 1060 relative to the dorsal side, as identified in FIG. 3, and extending perpendicularly therefrom, as shown in FIG. 7. To effectively place the scans relative to the dorsal side of the fillet, the end of the dorsal side nearest to the removed fish head must be identified because, as discussed previously, pin bones extending from a fish spinal column are unwanted tissue. If the fish fillet is desirably oriented, as discussed previously, the leading edge of the fish is the end point of the dorsal side, called the dorsal neck point 1055. For other orientations where the leading edge of the fish fillet or other food product is not a useful location on the model, it is contemplated that the process can be modified to account for such circumstances. In other embodiments, any suitable identifiable characteristic unique to a food product can be used to place the scans.

After identifying the starting point for the scan lines 1060, like the dorsal neck point 1055, the curvature of the dorsal side of the fish fillet is approximated using a regression analysis. By approximating the edge, or other reference point, of the food product, the scan lines 1060 can be placed at any angle relative to the regression line. In the present embodiment, the scan lines 1060 are placed perpendicularly to the regression line and extend across the width of the fillet as shown in FIGS. 7-9.

Once a reference point (or series of reference points) is identified, for example, the dorsal neck point 1055 and/or dorsal side for a fish fillet, the processor 1030 can place scan lines 1060 across the three-dimensional model 1050. In the present embodiment, the scan lines 1060 are placed at intervals of two millimeters; however, any other suitable interval may be used based on user preferences. Finer or coarser intervals may also be desirable depending on the type of food product being processed. For example, pin bones are small and thin, and, thereby, require a fine scale to accurately estimate the location of each bone. Therefore, based on the density or size of the unwanted tissue to be identified, the intervals may be adjustable.

Figure 8:
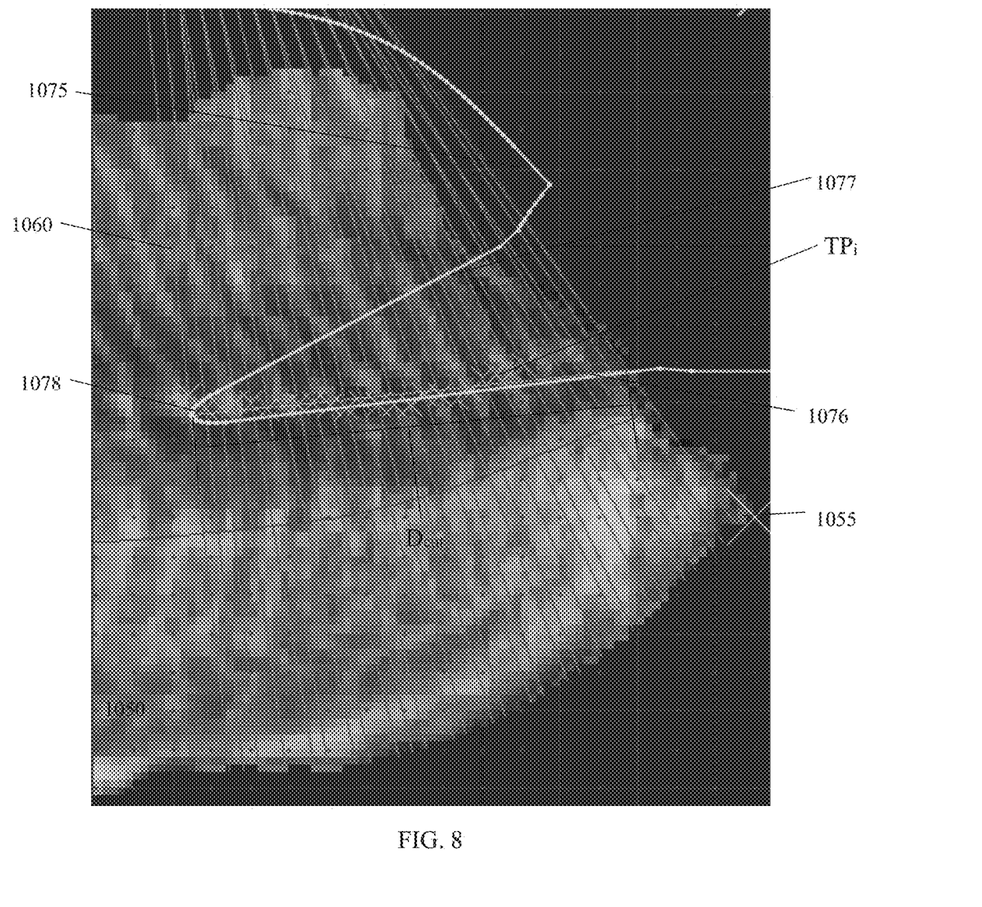
FIG. 8 is a top, close-up view of the image of FIG. 7.

In the present embodiment shown in FIGS. 7 and 8, the scan lines 1060 extend over a portion of the model 1050. The scan lines 1060 begin at the head of the fish fillet and extend toward to the tail of the fish fillet model 1050. The scan lines 1060 cease at the desired depth of the cut, $D_{cut}$, as specified by a user and/or the type of food product and location of the unwanted tissue.

Figure 9:
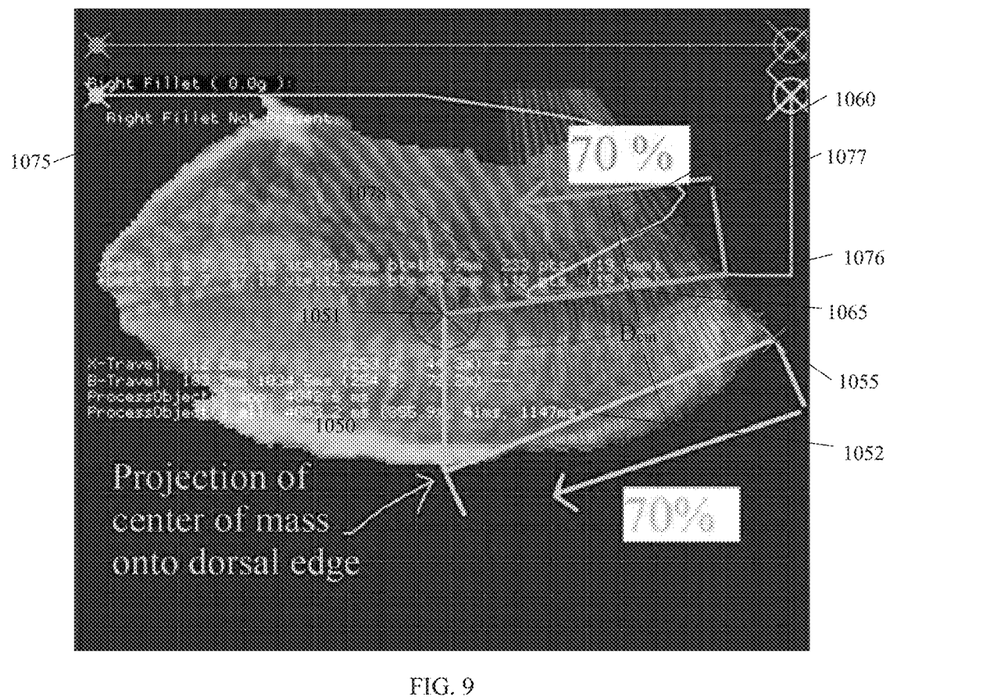
FIG. 9 is a top view of the image of FIG. 7 showing the projected center of mass.

As shown in FIG. 9, the user-specified depth at which to end the scan lines 1060 is, for example, approximately 70% of the distance between the dorsal neck point 1055 and the center of mass 1051. This approximation for ceasing scan lines 1060 is determined by finding the center of mass 1051 of the model 1050 and projecting the center of mass 1051 onto the dorsal side of the model 1050. A straight line 1052 is generated between the projected center of mass on the dorsal side and the dorsal neck point 1055. The scan lines 1060 end at the user-specified percentage of the depth, $D_{cut}$, of the line 1052, approximately 70%.

In other embodiments, the desired depth of the cut, $D_{cut}$, may vary for different food products and may be measured from any suitable identifiable characteristic in the food product model. For instance, certain cuts of steak, like top sirloins, may have a thin layer of fat extending along the length of the side of the beef. Because the layer of fat is thin, the depth of the cut, $D_{cut}$, may only need to be 5% of the distance between the side of the beef model and the center of mass. Thus, scan lines would only need to be placed over the corresponding 5% of the model to be cut.

In other embodiments, it is contemplated that the scan lines begin and end at any location on the food product model 1050, including extending across the entire length of the model. For example, if the model was of a T-bone cut of steak, the scans would ideally extend over the portion of the cut containing the T-bone such that cut paths can be generated, as will be described in further detail below.

Figure 10A:
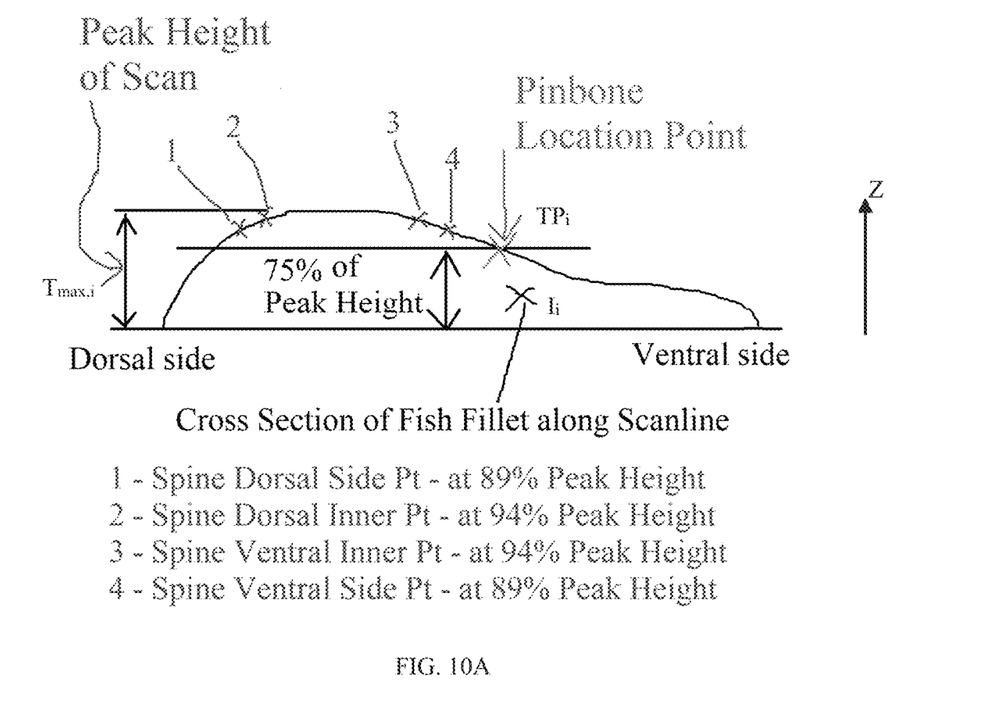
FIG. 10A is an embodiment of a cross-sectional view of a three-dimensional model of a food product.
Figure 10B:
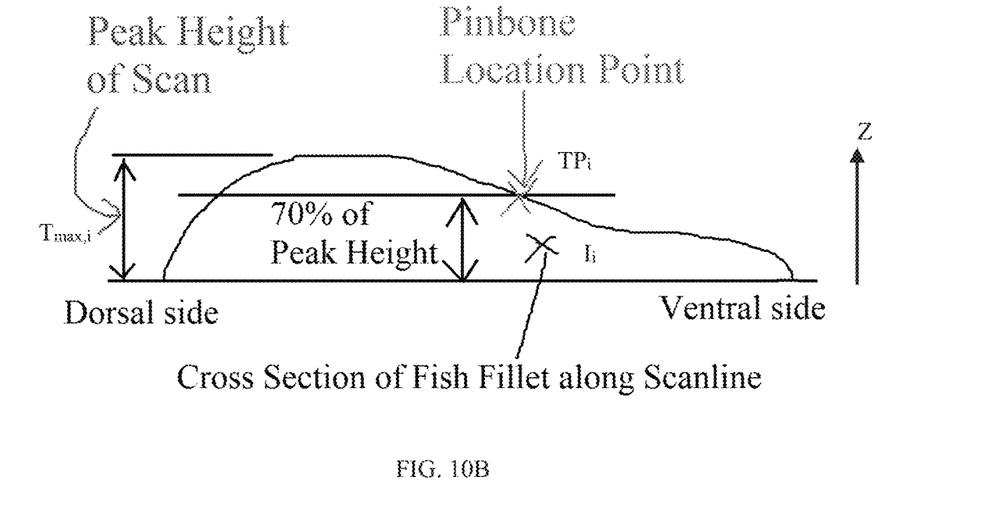
FIG. 10B is an alternative embodiment of a cross-sectional view of a three-dimensional model of a food product.

After the scan lines 1060 are mapped to the model 1050, the processor 1030 generates cross-sectional scanning images, $I_i$, where i equals 1, 2, 3, ... n and n is an integer greater than 1, where each scanning image corresponds to a scan line 1060. As shown in FIGS. 10A and 10B, for each of the cross-sectional images, the processor 1030 determines various characteristics of the food product model at that location, including the maximum thickness of the model, $T_{max,i}$, the change in thickness across the model, the width of the model, and the three-dimensional coordinates of the scan. Maximum thickness may be interpreted to mean above a certain percentage threshold, like 95%, because noise may obscure the accuracy of the model. In other embodiments, the processor 1030 may calculate other suitable characteristics related to processing a particular food product.

In the present invention, once relevant characteristics are calculated for each cross-sectional scanning image, the processor 1030 can then identify estimated tissue points, $TP_i$, corresponding to points of unwanted tissue, like bones. Often in the food processing industry, the same cuts of a certain food product may share the same unwanted tissue, for example, fish fillets can contain pin bones. Therefore, the location of such unwanted tissue can be estimated with reasonable accuracy based on the common cut, i.e. the location of the unwanted tissue is substantially common across all cuts of a food product. For example, as shown in FIG. 10A, pin bones in fish fillets are located closer to the ventral side of the fish fillet, rather than the dorsal side, at approximately 75% of the maximum thickness of the cross-section of the fillet. Thus, the processor 1030 identifies an estimated tissue point, $TP_i$, at 75% of the maximum thickness of each cross-sectional scanning image, $I_i$, along the scan line. In an alternative embodiment, shown in FIG. 10B, the estimated tissue points, $TP_i$, are located at 70% of the maximum thickness of each cross-sectional scanning image, $I_i$, along the scan line.

Likewise, the estimated tissue points, $TP_i$, may be estimated based on being on the ventral side of the fillet model and a corresponding distance from the point maximum thickness. That would allow a distance to be calculated customized based on a particular size of the fillet model. In other embodiments, the estimated tissue points, $TP_i$, may be estimated based on the distance from the spine of the fish, or the thickest part of the model, because the pin bones typically follow a curve similar to that of the maximum thickness of the model 1050.

Figure 11:
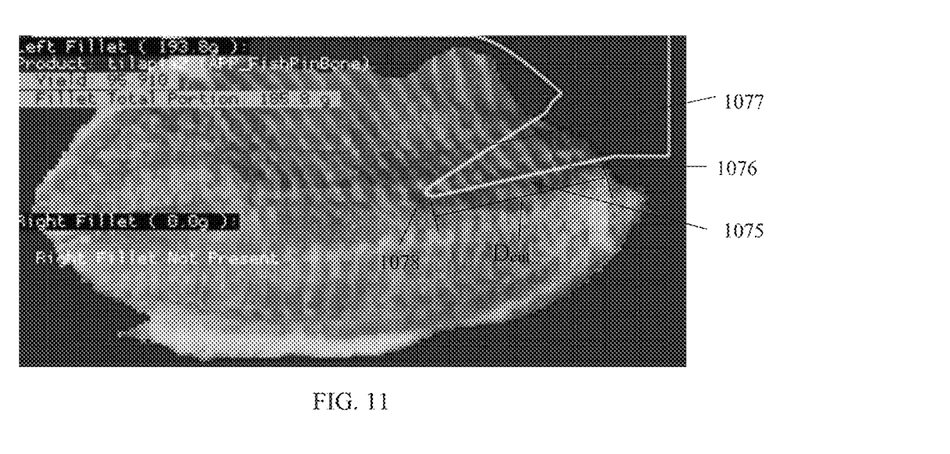
FIG. 11 is a top view of the grayscale image of the fish fillet of FIGS. 3A-B.

In some embodiments, as shown in FIG. 11, the processor 1030 may incorporate additional inputs from a grayscale image scanner to verify the estimated tissue points identified using relevant characteristics of the food product. A grayscale image can be captured from the scanner 1020 by measuring the intensity of the laser 1024 in the same images captured by digital camera 1023, discussed above. Hence, scanner 1020 can use laser 1024 and digital camera 1023 to not only measure position to form a three-dimensional model, but also measure intensity to form a grayscale model. The pin bones in fish fillets may appear in a grayscale image as a series of white dots extending from the head side of the fish. It is contemplated that processor 1030 may be programmed to identify such a pattern in a grayscale image of the fish fillet and verify the location of the estimated tissue points on the three-dimensional model 1050. A grayscale model may verify the location of the tissue points in various ways. For example, the processor 1030 may implement a confidence score based on the brightness of the suspect dots, the signal to noise ratio, and the spacing and positioning of the dots. If the confidence score is within a suitable range, the fillet will proceed to the cutting assembly 1040. If the confidence score is outside of a suitable range, the fillet model may be reassessed to verify the estimated pin bone locations. Alternatively, the model 1050 and grayscale model may be used in conjunction to devise a cut path to satisfy each model individually. Verifying the location of the estimated tissue points can result in fitting a more accurate curve, as will be described in detail below, and, thus, capturing the unwanted tissue. Grayscale imaging can be particularly useful for identifying and/or verifying the location of fatty tissues in food products, like beef.

Other combinations of image processing scanners may be used in conjunction with the scanner 1020 and grayscale image scanner to verify the location of unwanted tissues in food products, including x-ray scanners, particularly for locating bones.

Once the processor 1030 generates an estimated tissue point for each cross-sectional scanning image, the processor 1030 fits a curve 1065 to the estimated tissue points based on their associated coordinates in the three-dimensional model 1050. In some embodiments, the fitted curve 1065 may be adjusted or approximated based on a subsection of the estimated tissue points, such as by excluding outliers or points outside a specified range. The curve 1065 can be fitted using any suitable mathematical methodology, including, for example, polynomial regression and polynomial interpolation.

Alternatively, the fitted curve 1065 could be iteratively adjusted or approximated based on another feature of the food product. For example, the points of maximum thickness in the model may follow a similar curve of the estimated pin bone locations such that those points may form a curve model to adjust the fitted curve 1065. That is, the points of maximum thickness generally follow a parallel curve to that of the pin bones.

In some embodiments, an iterative approach to mapping scan lines 1060 may be implemented. For example, if scan lines 1060 are initially placed perpendicular to the regression line approximating the dorsal side of the fish on the model 1050 such that the scan lines are not evenly spaced across the fitted curve 1065, the processor 1030 may adjust the lines 1060 to create even intervals, or denser intervals, over the fitted curve 1065. Such a recalculation of the scan lines 1060 allows for the area of unwanted tissue to be more closely estimated. The intervals can be adjusted by changing the scan angle at which the scan lines 1060 meet the regression line of the dorsal side of the model. For example, instead of extending perpendicularly from the dorsal side regression line, as previously described, the scan lines 1060 may deviate from 90° accommodate the change in intervals.

Based on the fitted curve 1065, the processor 1030 generates a cut path 1075 to remove an area of unwanted tissue from the food product, thereby, capturing the fitted curve 1065. In the present invention, the trajectory of the cut path 1075 depends on user-specified inputs, including the desired depth of the cut and width of the removal. As shown in FIG. 9, the cut path 1075 is triangular or V-shaped such that the cut path 1075 captures the fitted curve 1065 up to the user-specified cut depth, 70%, and exits the food product at a user-specified width such as to capture an unwanted area of tissue. The fitted curve 1065 serves as the starting position of an initial cut path. The fitted curve 1065 is then rotated by a user-specified angle toward the dorsal side of the fish fillet, as shown in FIG. 9, thereby, forming a dorsal side of the cut path 1076. Similarly, the fitted curve 1065 is rotated by a user-specified angle toward the ventral side of the fish fillet. As shown in FIG. 9, thereby, forming a ventral side of the cut path 1077. The ventral side cut path 1077 and dorsal side cut path 1076 together form a triangular-shaped cut. A user may also specify the width of the tip cut path 1078 such that the cut path 1075 resembles a trapezoid rather than a triangle. In other embodiments, any suitable user-specified parameters may be incorporated into the generation of the cut path 1075 depending on the cut and type of food product being processed. It is also contemplated that the cut path be modified to match any curvature in the fitted curve, as previously described.

Figure 12:
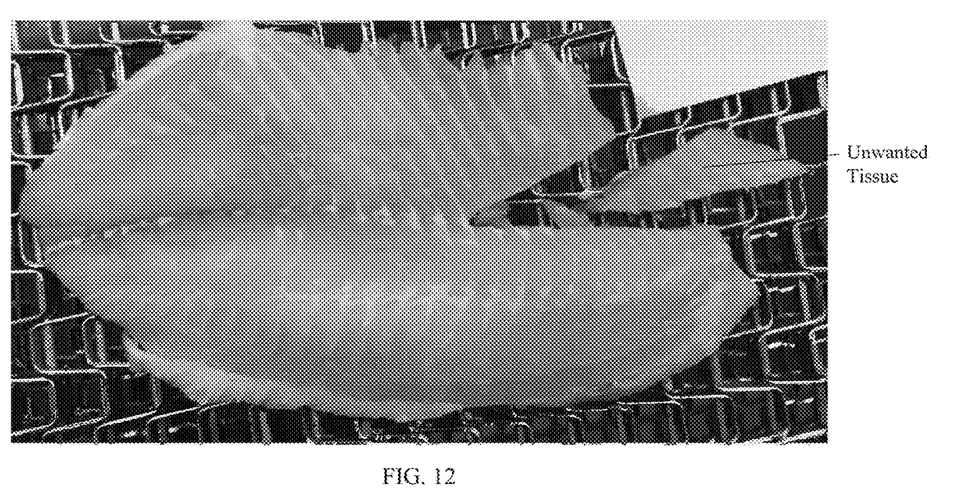
FIG. 12 is a top view of the fish fillet of FIGS. 3A-B having tissue removed in accordance with the method of FIG. 2.

After generating the cut path 1075, the food product is carried to the cutting assembly 1040 by the cutting conveyor 1014. The cutting assembly 1070 executes step 1071 by cutting away the unwanted tissues according to the generated cut path 1075, as shown in FIG. 12. As previously described, the cut path 1075 is generated by the processor 1030 in a coordinate system corresponding to the "real-world" position of the food product relative to system 1000, and, thus, the cutting assembly 1040 can simply cut the food product according to the cut path 1075.

In some embodiments, the cutting assembly 1040 includes high-pressured water jets for cutting the food product or any other suitable cutting mechanism known in the food processing industry, like knives or blades. In other embodiments, a mechanical method for pulling out pin bones, such as vacuums, may be used. The cutting assembly 1040 may also be capable of cutting the food product at a user-specified angle relative to the z-axis (not shown) perpendicular to the x-y axis shown in FIGS. 3A-B. Cutting the food product at an angle can be efficient in some instances to limit to the amount of neighboring, desirable food product removed from the food product. Further, a cutting assembly 1040 with adjustable cutting heads or a similar means for adjusting cutting angles can more easily remove irregularly-shaped unwanted tissues in food products.

In some embodiments, the computer system 1025 includes a graphical user interface 1026 (GUI). GUI 1026 allows a user to provide user-specified cut path characteristics or parameters for defining the cut path 1075. In the present invention, a user may input the angle of the cut path, the width of the cut path, and the depth of removal of unwanted tissue. The available parameters for user specification may vary for each type or cut of food product.

In summary, an improved method is disclosed for identifying and removing unwanted food product (e.g. bones, cartilage, and fat). The improved method includes an improved, accurate method of estimating tissue. All of the enhancements expand the functionality of the processing of foods with unwanted tissues and increase the efficiency of identifying such unwanted tissues.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for identifying and removing tissue from a food product, comprising:
   generating a three-dimensional model of a food product using a scanner;
   mapping the three-dimensional model onto the food product;
   scanning the food product such that cross-sectional scanning images, $I_i$, are generated based on the three-dimensional model, wherein i=1, 2, 3, . . . n and n is an integer greater than 1;
   for each cross-sectional scanning image, $I_i$, determining a maximum thickness, $T_{max,i}$, of the food product based on the three-dimensional model;
   for each cross-sectional scanning image, $I_i$, identifying a corresponding estimated tissue point, $TP_i$, by using an identification method selected from the group consisting of:
   a) wherein a thickness of the cross-sectional scanning image, $I_i$, of the three-dimensional model is at least a predetermined percentage of the maximum thickness, $T_{max,i}$, on the food product, and
   b) wherein the point, $TP_i$, is selected as being on the ventral side of the point of maximal thickness, $T_{max,i}$, and at a distance from the point of maximal thickness, $T_{max,i}$, where the distance can be customized based on a particular size of the model;
   the method further comprising:
   fitting a curve to the estimated tissue points, $TP_i$;

generating a cut path based on the fitted curve, wherein the cut path defines an area of unwanted tissue that comprises the estimated tissue points, $TP_i$;

cutting the food product along the cut path, thereby, removing the area of unwanted tissue.

2. The method of claim 1, wherein the estimated tissue point $TP_i$, is calculated as a percentage of the maximum thickness and that percentage is approximately 70%.

3. The method of claim 1, wherein the cut path is angled as measured from a z-axis.

4. The method of claim 3, further comprising:
selecting at least one characteristic of the angled cut path, wherein the characteristic is selected from the group consisting of: width, cut angle, and depth.

5. The method of claim 1, further comprising:
verifying the set of estimated tissue points, $TP_i$, by generating a verified image of the food products.

6. The method of claim 5, wherein the verified image is a grayscale image.

7. The method of claim 1, wherein the cutting is performed by water jets.

8. The method of claim 1, wherein the removing of the area of unwanted tissue is performed by a vacuum or mechanically.

9. A system for identifying and removing tissue from a food product, comprising:
a scanner for generating a three-dimensional model of the food product, wherein the scanner scans the food product such that cross-sectional scanning images, $I_i$, are generated, wherein i=1, 2, 3, . . . n and n is an integer greater than 1;
a processor for mapping the three-dimensional model onto the food product, scanning the food product such that cross-sectional scanning images, $I_i$, are generated based on the three-dimensional model, wherein i=1, 2, 3, . . . n and n is an integer greater than 1, for each cross-sectional scanning image, $I_i$, determining at least a maximum thickness, $T_{max,i}$, of the food product based on the three-dimensional model, for each cross-sectional scanning image, $I_i$, identifying a corresponding estimated tissue point, $TP_i$, by using an identification method selected from the group consisting of: (a) wherein a thickness of the cross-sectional scanning image, $I_i$, of the three-dimensional model is at least a predetermined percentage of the maximum thickness, $T_{max,i}$, on the food product, and (b) wherein the point, $TP_i$, is selected as being on the ventral side of the point of maximal thickness, $T_{max,i}$, and at a distance from the point of maximal thickness, $T_{max,i}$, where the distance can be customized based on a particular size of the model; fitting a curve to the estimated tissue points, $TP_i$, and generating a cut path based on the fitted curve, wherein the cut path defines an area of unwanted tissue that comprises the estimated tissue points, $TP_i$;
a cutting assembly for cutting the food product along the cut path, thereby, removing the area of unwanted tissue.

10. The system of claim 9, wherein the estimated tissue point $TP_i$, is calculated as a percentage of the maximum thickness and that percentage is approximately 70%.

11. The system of claim 9, wherein the cut path is angled as measured from a z-axis.

12. The system of claim 11, further comprising:
a graphical user interface for selecting at least one characteristic of the angled cut path, wherein the characteristic is selected from the group consisting of: width, cut angle, and depth.

13. The system of claim 9, further comprising:
an infeed conveyor for transporting the food product by the scanner.

14. The system of claim 13, further comprising:
an outfeed conveyor upon which the food product is cut, wherein the outfeed conveyor is placed adjacent to the infeed conveyor such that the food product can transfer from the second end of the infeed conveyor onto the outfeed conveyor.

15. The system of claim 9, wherein the scanner verifies the estimated tissue points, $TP_i$, prior to cutting with a verified image.

16. The system of claim 15, wherein the verified image is a grayscale image.

17. The system of claim 9, wherein the cutting assembly comprises water jets.

18. The method of claim 9, wherein the cutting assembly comprises a vacuum or mechanical removal means.

19. A non-transitory computer-readable medium for executing instructions regarding a method for identifying and removing tissue from a food product, the method comprising:
mapping a three-dimensional model onto a food product;
scanning the food product such that cross-sectional scanning images, $I_i$, are generated based on the three-dimensional model, wherein i=1, 2, 3, . . . n and n is an integer greater than 1;
for each cross-sectional scanning image, $I_i$, determining at least a maximum thickness, $T_{max,i}$, of the food product based on the three-dimensional model;
for each cross-sectional scanning image, $I_i$, identifying a corresponding estimated tissue point, $TP_i$, by using an identification method selected from the group consisting of: (a) wherein a thickness of the cross-sectional scanning image, $I_i$, of the three-dimensional model is at least a predetermined percentage of the maximum thickness, $T_{max,i}$, on the food product, and (b) wherein the point, $TP_i$, is selected as being on the ventral side of the point of maximal thickness, $T_{max,i}$, and at a distance from the point of maximal thickness, $T_{max,i}$, where the distance can be customized based on a particular size of the model
fitting a curve to the estimated tissue points, $TP_i$, and
generating a cut path based on the fitted curve, wherein the cut path defines an area of unwanted tissue that comprises the estimated tissue points, $TP_i$;
controlling a cutting assembly for cutting the food product along the cut path, thereby, removing the area of unwanted tissue.

* * * * *